Feb. 23, 1965 K. E. SNAY ETAL 3,170,539
CONVEYOR LUBRICATING APPARATUS
Filed May 14, 1962 2 Sheets-Sheet 1

FIG.1.

INVENTORS
KENNETH E. SNAY
EDGAR VICTOR BORDEN
BY
Whittemore
Hulbert & Belknap
ATTORNEYS Feb. 23, 1965     K. E. SNAY ETAL     3,170,539

CONVEYOR LUBRICATING APPARATUS

Filed May 14, 1962     2 Sheets-Sheet 2

INVENTORS
KENNETH E. SNAY
BY EDGAR VICTOR BORDEN

ATTORNEYS 3,170,539
CONVEYOR LUBRICATING APPARATUS
Kenneth E. Snay, Dearborn, and Edgar Victor Borden, Livonia, Mich., assignors to Seco Chemicals Incorporated, Detroit, Mich., a corporation of Michigan
Filed May 14, 1962, Ser. No. 194,558
13 Claims. (Cl. 184—15)

The invenion relates to lubricating and refers more specifically to a method of and means for automatic lubrication of mechanism such as dairy conveyors with a lubricant such as a soap, water and water softening additive mixture.

In the past conveyor mechanisms and the like have often been lubricated with the usual petroleum oils, greases and the like. Such lubrication is, however, undesirable in food processing plants. Therefore, it has been known to lubricate food processing industry mechanisms such as dairy conveyors with a soap lubricant.

The soap lubricant has been applied to the mechanisms by hand or at best has been stored in a hand filled reservoir at a fixed point and gravity fed to the mechanism to be lubricated. These lubricating methods and apparatus generally require manual mixing of a soap concentrate with a diluent such as water. Attempts to provide automatic lubricant mixing and distribution have failed in the past due to either improper mixing or distribution or both whereby the distribution apparatus has been clogged.

It is therefore one of the objects of the present invention to provide improved means for automatic lubrication of mechanisms such as dairy conveyors with a lubricant such as a soap, water and water softening additive mixture.

Another object is to provide an improved method for mixing and applying a lubricant such as a mixture of soap, water and water softening additive to mechanism such as dairy conveyors.

Another object is to provide lubricating apparatus including means for storing a lubricant concentrate, a lubricant reservoir, means for automatically metering a predetermined quantity of lubricant concentrate and water into the lubricant reservoir in response to dilute lubricant in the lubricant reservoir reaching a predetermined minimum level and means for pumping the dilute lubricant from the lubricant reservoir to the mechanism to be lubricated.

Another object is to provide lubricating apparatus as set forth above, wherein the lubricant concentrate is soap and further including means for storing a water softening additive and for metering a predetermined quantity of water softening additive into the lubricant reservoir exactly proportioned in relation to the soap and water metered into the lubricant reservoir.

Another object is to provide lubricating apparatus as set forth above including means for sequencing the addition of the additive, soap concentrate and water to the lubricant reservoir so that the additive is first metered into the lubricant reservoir with water before the soap is metered into the reservoir.

Another object is to provide a storage container for soap concentrate including a soap level sight glass, and means for withdrawing soap from the container without producing soap suds in the sight glass.

Another object of the invention is to provide means for distributing a lubricant, such as a soap and water mixture from a lubricant reservoir under pressure to remote locations comprising a pump and a pressure switch in series in the lubricant reservoir output conduit, a ballast tank positioned in the output conduit operable to actuate the pressure switch in response to pressure variations therein and a motor responsive to the pressure switch for running the pump to maintain the pressure in said ballast tank between predetermined limits.

Another object is to provide a method of lubricating dairy conveyors or the like with a lubricant comprising soap, water and a water softening additive comprising storing soap concentrate and water softening additive under pressure, metering predetermined quantities of additive and water into a lubricant reservoir in response to the level of lubricant in the reservoir reaching a predetermined minimum level, subsequently metering a predetermined amount of soap concentrate and water into the lubricant reservoir, filling the reservoir with water and subsequently pumping the lubricant stored in the reservoir under pressure to remote apparatus to be lubricated.

Another object is to provide a lubricating method and apparatus which is simple, economical and efficient.

Other objects and features of the invention will become apparent as the description proceeds, especially when taken in conjunction with the accompanying drawings, illustrating a preferred embodiment of the invention, wherein:

FIGURE 1 is a diagrammatic illustration of lubricating apparatus constructed in accordance with the invention showing a portion of the lubricant reservoir broken away.

Figure 2:
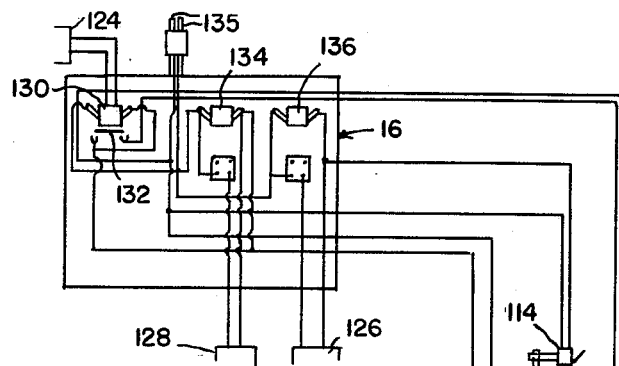
FIGURE 2 is a partial section of the lubricant reservoir of the lubricating apparatus illustrated in FIGURE 1 and particularly shows the electrical schematic of the mixture control portion of the lubricating apparatus.

With particular reference to the figures of the drawings, the present invention will now be considered in detail.

The lubricating apparatus 10 of the invention as shown best in FIGURE 1 comprises apparatus 12 for storing a soap concentrate and water softening additive under pressure, a lubricant reservoir 14 for mixing and storing a soap, water softening additive and water mixture lubricant and mixture control apparatus 16 for automatically metering soap concentrate and water softening additive from the apparatus 12 and water from conduit 18 in predetermined proportions at predetermined times into the lubricant reservoir 14 in response to the level of the lubricant in the reservoir 14 falling to a predetermined minimum level. Lubricating apparatus 10 further includes the means 20 for maintaining a predetermined lubricant output pressure and lubricant distribution means 22.

The lubricating method of the invention comprises storing the soap concentrate and water softening additive under pressure in the apparatus 12, sequentially metering the additive and water and then the soap concentrate and water into the lubricant reservoir, after which the reservoir is filled with water in response to the lubricant in the reservoir reaching a predetermined minimum level and distributing the dilute lubricant in reservoir 14 to mechanism to be lubricated under pressure variable between predetermined limits.

More specifically the apparatus 12 includes storage means 24 for the water softening additive, storage means 26 for the soap concentrate and apparatus 28 for supplying air under pressure to the additive and soap storage means 24 and 26.

The additive storage means comprises a replaceable container or barrel 30 in which the additive may be purchased or placed after purchasing, an air input coupling 32 including a shut-off valve 34 and an additive output coupling 36 including a cut-off valve 38. A sight glass 40 is provided between the input coupling 32 and output coupling 36 as shown best in FIGURE 1. The container 30 is supported on a metal frame 42 which is mounted on wheels 44 for ready movement.

The soap storage means 26 is similar to the additive storage means 24 and includes the container 46, input coupling 48, output coupling 50, sight glass 52, metal frame 54 and wheels 56. The soap storage apparatus 26 is however different from the additive storage apparatus 24 in that a special fitting 58 is provided in conjunction with the output coupling 50, between the outlet coupling 50 and container 46. Special fitting 58 has a unique function in that it prevents soap which is drawn from the container 46 through conduit 60 from passing directly beneath the open lower end of the sight glass 52 and therefore producing soap suds in the sight glass 52 which would prevent an accurate determination of the level of soap remaining in the container 46.

Figure 4:
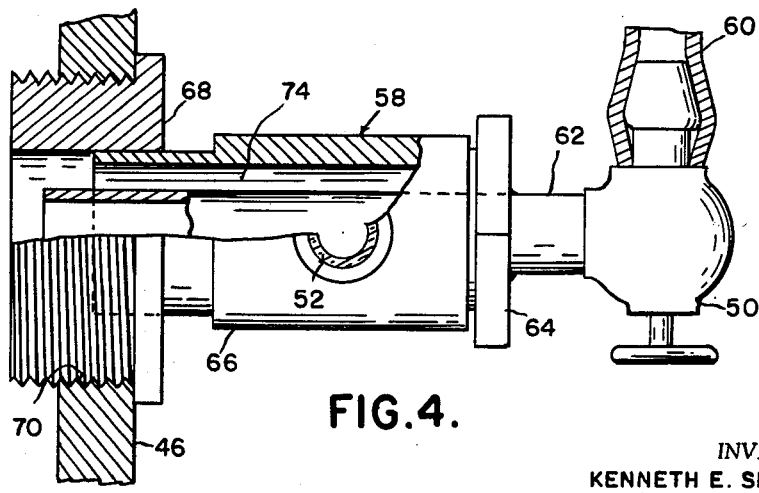
FIGURE 4 is a partial section through the lubricating apparatus illustrated in FIGURE 1 showing the soap container discharge fitting and coupling of the invention and taken substantially on the line 4—4 in FIGURE 1.

As best shown in FIGURE 4 the fitting 58 includes an inner tubular member 62 welded to a collar 64 to which an outer cylindrical member 66 is also secured by convenient means, such as welding at one end. The other end of the outer cylindrical member, as shown best in FIGURE 4, is welded or otherwise rigidly secured to the adapter 68 adapted to screw into a threaded outlet opening 70 in the container 46. The sight glass 52, as shown best in FIGURE 4, is secured to the outer cylindrical member in communication with the annular space 74 between the tubular member 62 and the outer cylindrical member 58 while the tubular member 62 is connected to the output conduit 60 through the output coupling 50.

Thus in operation it will be seen that the soap concentrate drawn from the container 46 through the conduit 60 may be taken from the interior of the container depending on the length of the tubular member 62 which may be increased by means of a hose (not shown) secured over the inner end thereof. The soap in the annular cylindrical space 74, is thus substantially undisturbed. The soap drawn through conduit 60 will therefore not cause soap suds in the sight glass 52 to prevent accurate reading of the soap level in the container 46.

The apparatus 28 for supplying air under pressure to the additive and soap concentrate storage means 24 and 26 comprises the source of air under pressure 76, air regulator 78 for regulating the pressure of air in the containers 30 and 46 to approximately four pounds and air transfer conduits 80, 82 and 84 joined with the input couplings 32 and 48, as shown best in FIGURE 1. A pressure relief valve 86 is supplied at the end of the air supply conduit 80 to further regulate the maximum air pressure provided in the containers 30 and 46.

Lubricant reservoir 14 comprises the relatively large tank 88 for mixing the additive and soap concentrate from the containers 30 and 46 in predetermined quantities with a predetermined quantity of water and the float type switch actuating assemblies 90 and 92 shown best in FIGURE 2.

The switch actuator 90 comprises a lever arm 94 mounted on pivot means 96 at one end and having the ball float 98 at the other end which has a returned end portion 100 operable to engage the actuating plunger 102 of microswitch 104 of the mixture control apparatus 16 when in the position shown in FIGURES 1 and 2 with the lubricant reservoir substantially full of the lubricant mixture.

Switch actuator 92 includes the elongated tubular member or sleeve 106 supported by brackets 108 from the lubricant reservoir 14 and the rod 110 extending through sleeve 106 and having the ball type float 112 secured to the lower end thereof as shown best in FIGURE 2. In operation the rod 110 is moved longitudinally through the sleeve 106 as the lubricant level in the tank 88 varies to actuate the micro-switches 114 and 116. The tank 88 is provided with an outlet coupling 118 leading to the reservoir outlet conduit 120 between the coupling 118 and the lubricant pump 122.

The mixture control apparatus 16 includes the microswitches 104, 114 and 116, the solenoid operated valves 124, 126 and 128, the solenoid and armature 130 and 132 respectively and the timers 134 and 136, best shown in FIGURE 2. The mixture control apparatus 16 in operation first energizes the solenoid operated valve 124 through conductors 138 to permit water to flow through the inlet conduit 18 into conduit 140 and thus into the lubricant reservoir 14. At the same time the solenoid operated valve 128 is opened to permit additive to pass from container 30 through conduit 142 and into the lubricant reservoir 14 through conduit 140. A predetermined time later the solenoid operated valve 128 is deenergized to halt the flow of additive to the lubricant reservoir 14.

The mixture control apparatus 16, as will become more evident subsequently when the over-all operation of the lubricating apparatus is considered, also causes the solenoid operated valve 126 to open for a predetermined time to meter a predetermined quantity of soap concentrate into the lubricant reservoir 14 after the solenoid operated valve 128 has been opened a time sufficient to provide a predetermined amount of additive in the lubricant reservoir 14 and the fluid in the tank 88 is at a predetermined level.

The sequencing of the opening of the valves 124, 126 and 128 and the closing of valve 124 is controlled by the float type valve actuating means 90 and 92 as will be considered in more detail subsequentially. The length of time the valves 126 and 128 are opened is determined by the timers 136 and 134 respectively. Electrical energy for actuating the components of the mixture control apparatus 16 is provided from a remote source (not shown) over conductors 135.

The means 20 for maintaining a predetermined output pressure includes the previously recited pump 122, motor 125 mechanically connected to the pump 122 for driving the pump 122 to transfer lubricant from the reservoir outlet conduit 120 to the distribution conduit 144, the ballast tank 146 and the pressure sensitive electric switch 148. The switch 148 is provided to connect the motor 125 to a source of electrical energy (not shown) over conductors 150 at any time the lubricant pressure in the ballast tank 146 falls to a predetermined lower limit such as for example forty-five pounds. Motor 125 thereafter runs to operate pump 122 and pump lubricant from reservoir 14 into ballast tank 146 until the pressure in the ballast tank 146 is at a higher predetermined pressure, such as fifty-eight pounds. At the higher pressure the switch is again actuated to disconnect the motor 125 from the source of electrical energy therefore and the motor 125 is stopped.

A return conduit 152 having a manually operated valve 154 therein is connected to the distribution conduit 144 to return the lubricant in the ballast tank substantially immediately to the lubricant reservoir 14 whereby pressure in the ballast tank can be rapidly reduced to check system operation.

The distribution apparatus 22 includes the distribution conduit 144 which may be varied in length and may in fact have a plurality of branches of different lengths which extend to the mechanism to be lubricated. The distribution conduit 144 will in most installations extend past a plurality of mechanisms or sections of a single mechanism to be lubricated with lubricant being drained therefrom onto the mechanism or sections thereof. As shown in FIGURE 1, the lubricant is drained from the conduit 144 through a series of valves or petcocks 156 which may be opened to drain lubricant into the tubes 158 having a flared upper end and extending to within a very short distance of the mechanism to be lubricated, for example, the sections of a dairy conveyor 160.

The soap concentrate may be what is commercially known as 40% liquid coconut soap which is a water solution containing about 36% by weight of the potassium soap of coconut fatty acid, the major constituent of which is lauric acid. Rather than a single refined chemical, commercial 40% liquid coconut soap may be a mix of available fatty acids of low molecular weight.

The solution may also contain about 4% glycerine depending on how the soap is manufactured. The soap concentrate may also include a trace, for example .5% of a chemical used to tie up water hardness present in the water, thereby preventing the formation of insoluble soaps and thus maintaining clarity in the finished product. Also the 40% liquid coconut soap may contain a small amount, for example .05% of preservative to prevent rancidity during storage.

The water softening additive may be different depending upon the type of hardness in the water with which the soap concentrate is to be mixed to provide the lubricant. The additive in many instances is the tetra sodium salt of ethylene diamine tetracetic acid. Such additive is used to tie up calcium, magnesium and other objectionable metal ions in water. Normally soaps of calcium or magnesium initially formed in water produce a cloudy solution and eventually settle out as a precipitate. However it sometimes happens that the insolubles do not precipitate but gel out. This is especially true in the presence of detersive agents such as soluble soaps.

It is therefore essential that the hardness of the water be removed before the addition of the soluble soaps thereto to prevent the gelling of the water and soap concentrate and the consequent blocking of the distribution lines 120 and 144 from the lubricant reservoir 14. It is therefore necessary to sequence the addition of additive from container 30 and soap from container 46 into reservoir 14. The sequencing of the addition of the additive, soap and water to the reservoir 14 is controlled by the mixture control apparatus 16 automatically to maintain a constant supply of lubricant of a predetermined composition in reservoir 14.

Figure 3:
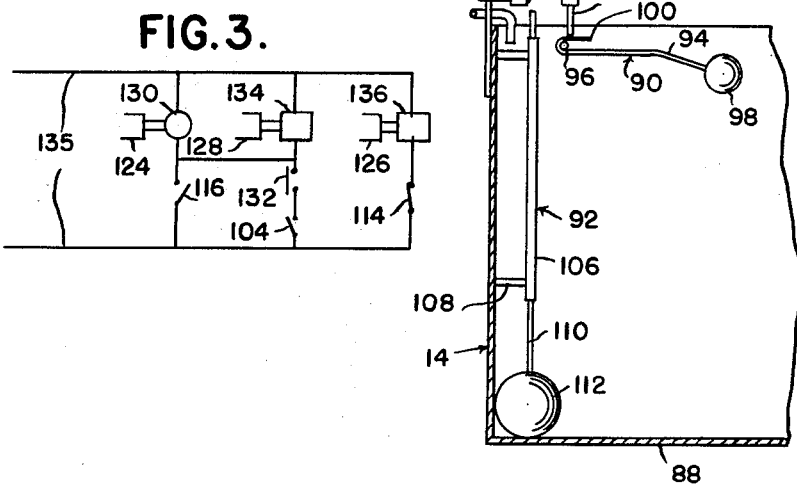
FIGURE 3 is a simplified circuit diagram of the mixture control portion of the lubricating apparatus illustrated in FIGURE 2.

Thus in over-all operation with the reservoir 14 full of lubricant the normally closed micro-switch 104 is opened by the actuator 90 and the switches 114 and 116 which are normally open and normally closed respectively are held in their closed and open positions respectively by the shaft 110 of the actuator 92. With the mixture control apparatus in this condition as illustrated in FIGURE 3, all of the solenoid actuated valves 124, 126 and 128 will be closed since timer 136 has timed out from a previous cycle of operation.

As lubricant stored in the ballast tank 146 is metered to the mechanism 160 to be lubricated the pressure in the ballast tank falls to forty-five pounds at which time the pressure switch 148 is actuated to energize motor 125. Energization of motor 125 will cause operation of the pump 122 to pump fluid out of the reservoir 14 into the ballast tank 146 until the pressure in the tank 146 is approximately fifty-eight pounds. During a number of pumping cycles the lubricant in the reservoir 14 will be gradually lowered.

On lowering of the lubricant level in reservoir 14, first the switch 104 is closed due to clockwise movement of the switch actuator 90. Subsequently the switch 114 is opened. On further lowering of the shaft 110, due to the level of the lubricant in the reservoir being lowered still further, the switch 116 is permitted to close by movement of the shaft 110 away from the switch 116.

On closing of the switch 116 a circuit is completed through the solenoid 130 to open the solenoid actuated valve 124 and start water flowing through the inlet conduit 140. Energization of the solenoid 130 further moves the armature 132 thereof to complete a circuit through the closed switch 104 and the armature 132 to maintain both the solenoid 130 and the timer 134 energized after the opening of the switch 116 as the level of lubricant in the reservoir 14 begins to rise. At the same time the solenoid 130 is energized by the closing of the switch 116, the timer 134 is energized whereby the solenoid operated valve 128 is opened for a predetermined time to meter additive into the reservoir 14 along with the water from the conduit 18.

Thus initially a quantity of water and additive are mixed in reservoir 14 so that the mixture in the lubricant reservoir 14 on subsequent adding of the soap concentrate thereto will not gel.

When the mixture in the lubricant reservoir rises to the point that shaft 110 closes switch 114 the solenoid actuated valve 126 is opened due to energizing timer 136 for a predetermined time so that a predetermined amount of soap is added to the mixture in the lubricant reservoir.

Thus the quantity of both the additive and soap concentrate are determined by the setting of the timers 134 and 136. The water is added in the lubricant reservoir until the switch 104 is opened by the switch actuator 90 on filling of the reservoir to a predetermined level. On opening of switch 104 the armature 132 is caused to physically move and solenoid 132 is deenergized to complete a mixing cycle of operation of the lubricating apparatus 10 of the invention.

It will be readily recognized that in accordance with the inventiion there has been provided a simple, economical and efficient apparatus for and method of lubricating mechanisms with a soap, water softening additive and water mixture lubricant. Further, while one embodiment of the invention has been described in detail it will be understood that modifications thereof are contemplated. It is therefore the intention to include all such modifications which suggest themselves from the above description within the scope of the invention.

The drawings and the foregoing specification constitute a description of the improved method of and apparatus for lubricating in such full, clear concise and exact terms as to enable any person skilled in the art to practice the invention, the scope of which is indicated by the appended claims.

We claim.

1. Lubricating apparatus comprising means for storing a soap concentrate and a water softening additive under pressure including a pair of containers, separate vertically separated input and output couplings connected to each of said containers, a sight glass extending between the input and output couplings of each of the containers and means connected to the outlet coupling of the container for storing soap concentrate for preventing formation of soapsuds in the sight glass due to withdrawing of soap through the output coupling of the container for storing soap concentrate, a source of air under a regulated pressure, and means for connecting the air under pressure to the input couplings of both containers including pressure relief valve means for limiting the maximum container pressure, a lubricant reservoir, mixture control means operable between the means for storing a soap concentrate and additive and the lubricant reservoir for metering predetermined quantities of soap concentrate, additive and water into the lubricant reservoir to provide a diluted lubricant, means for storing the diluted lubricant under pressure, and means for distributing the diluted lubricant from the reservoir to remote mechanisms to be lubricated.

2. Structure as set forth in claim 1 wherein the means for preventing formation of soapsuds in the sight glass associated with the soap storage container comprises a fitting extending between the output coupling and the container including an interior tubular member extending into the interior of the container, a collar secured to the outer circumference of the tubular member exteriorly of the container, an adapter secured in an opening in the soap storage container, a cylinderical member sleeved over the tubular member connected to the collar at one end and to the adapter at the other end defining an annular space between the inner surface thereof and the outer surface of the tubular member, means for connecting the sight glass to the cylindrical member in communication with the annular space and means for connecting the inner tubular member to the output coupling.

3. Lubricating apparatus comprising means for storing a soap concentrate and a water softening additive under pressure, a lubricant reservoir including a pair of float operated switch actuators mounted in fixed positions in the lubricant reservoir including portions movable for controlling flow of soap concentrate, additive and water into the reservoir, mixture control means operable between the means for storing a soap concentrate and additive and the lubricant reservoir including switches responsive to said switch actuators for metering predetermined quantities of soap concentrate, additive and water into the lubricant reservoir to provide a diluted lubricant, means for storing the diluted lubricant under pressure, and means for distributing the diluted lubricant from the reservoir to remote mechanisms to be lubricated.

4. Structure as set forth in claim 3 wherein one of said float operated switch actuators includes an elongated hollow, vertically extending, tube secured within the lubricant reservoir and the movable portion comprises a rod extending completely through the tube and beyond both ends thereof and a float secured to the lower end of said rod.

5. Lubricating apparatus comprising means for storing a soap concentrate and a water softening additive under pressure, a lubricant reservoir, mixture control means operable between the means for storing a soap concentrate and additive and the lubricant reservoir for metering predetermined quantities of soap concentrate, additive and water into the lubricant reservoir to provide a diluted lubricant comprising an electric circuit including three separate solenoid operated valves positioned between the lubricant reservoir and the means for storing the soap concentrate and additive and a source of water, a source of electrical energy and a plurality of switch means operable to connect the source of electrical energy to the valves in response to the lubricant in the reservoir reaching a predetermined limited level including a pair of timers in the electric circuit with said valves for timing the length of time the valves through which concentrate and additive are metered to the lubricant reservoir are open to provide predetermined amounts of soap and additive during a mixing cycle of the lubricating apparatus, float type actuators secured within the lubricant reservoir and switches included in said circuit positioned for actuation by said actuators operable in response thereto for sequencing the opening of the solenoid operated valve to first admit water and a predetermined amount of additive into the lubricant reservoir for subsequently metering water and a predetermined amount of soap concentrate into the lubricant reservoir and then for filling the reservoir to a predetermined level with water, means for storing the diluted lubricant under pressure, and means for distributing the diluted lubricant from the reservoir to remote mechanisms to be lubricated.

6. A container for soap concentrate or similar material, vertically spaced apart inlet and outlet couplings secured to the container, a sight glass secured to the inlet coupling for presenting a visual indication of the level of soap within the container and a fitting connected between the outlet coupling and container including an inner tubular member extending into the interior of the container through which the soap concentrate is withdrawn, a collar secured to the tubular member, an adapter secured to an opening in the container, an outer cylindrical member secured at one end to the collar and at the other end to the adapter to define an annular space between the cylindrical member and tubular member in communication with the interior of the container, and means for connecting the sight glass into the cylindrical member in communication with the annular space whereby soap may be withdrawn from the container through said tubular member and outlet coupling without forming soapsuds in the sight glass.

7. Lubricating apparatus comprising means for storing a soap concentrate and a water softening additive under pressure including a pair of containers, separate vertically separated input and output couplings connected to each of said containers, a sight glass extending between the input and output couplings of each of the containers and means connected to the outlet coupling of the container for storing soap concentrate for preventing formation of soapsuds in the sight glass due to withdrawing of soap through the output coupling of the container for storing soap concentrate, a source of air under a regulated pressure, and means for connecting the air under pressure to the input couplings of both containers including pressure relief valve means for limiting the maximum container pressure, a lubricant reservoir, mixture control means operable between the means for storing a soap concentrate and additive and the lubricant reservoir for sequentially metering predetermined quantities of additive and water, soap concentrate and water, and water into the lubricant reservoir to provide a diluted lubricant, means for storing the diluted lubricant under pressure, and means for distributing the diluted lubricant from the reservoir to remote mechanisms to be lubricated.

8. Structure as set forth in claim 7 wherein the means for preventing formation of soap suds in the sight glass associated with the soap storage container comprises a fitting extending between the output coupling and the container including an interior tubular member extending into the interior of the container, a collar secured to the outer circumference of the tubular member exteriorly of the container, an adapter secured in an opening in the soap storage container, a cylindrical member sleeved over the tubular member connected to the collar at one end and to the adapter at the other end defining an annular space between the inner surface thereof and the outer surface of the tubular member, means for connecting the sight glass to the cylindrical member in communication with the annular space and means for connecting the inner tubular member to the output coupling.

9. Structure as set forth in claim 7 wherein the means for distributing the lubricant comprises an elongated distribution conduit, a plurality of petcocks secured to the distribution conduit and a tubular section having a flared end positioned adjacent the outlet of each of the petcocks for receiving the lubricant therefrom and extending between each of the pet cocks and mechanism to be lubricated.

10. Lubricating apparatus comprising means for storing a soap concentrate and a water softening additive under pressure, a lubricant reservoir, mixture control means operable between the means for storing a soap concentrate and additive and the lubricant reservoir for sequentially metering predetermined quantities of additive and water, soap concentrate and water, and water into the lubricant reservoir to provide a diluted lubricant including a pair of float operated switch actuators mounted in fixed positions in the lubricant reservoir having portions movable for controlling flow of soap concentrate, additive and water into the reservoir, means for storing the diluted lubricant under pressure and means for distributing the diluted lubricant from the reservoir to remote mechanisms to be lubricated.

11. Structure as set forth in claim 10 wherein one of said float operated switch actuators includes an elongated hollow, vertically extending, tube secured within the lubricant reservoir and the movable portion comprises a rod extending completely through the tube and beyond both ends thereof and a float secured to the lower end of said rod.

12. Lubricating apparatus comprising means for storing a soap concentrate and a water softening additive under pressure, a lubricant reservoir, mixture control means operable between the means for storing a soap concentrate and additive and the lubricant reservoir for sequentially metering predetermined quantities of additive and water, soap concentrate and water, and water into the lubricant reservoir to provide a diluted lubricant, means for storing the diluted lubricant under pressure, including a ballast tank, a pump for pumping lubricant from the lubricant reservoir into the ballast tank, a motor connected to the pump for operating the pump, a source of electrical energy for operating said motor and means connected to the motor and source of electrical energy responsive to pressure in the ballast tank for connecting the motor to the source of electrical energy when the pressure in the ballast tank reaches a predetermined lower limit and for disconnecting the motor from the source of electrical energy when the pressure in the ballast tank reaches a predetermined upper limit and means for distributing the diluted lubricant from the reservoir to remote mechanisms to be lubricated.

13. Lubricating apparatus comprising means for storing a soap concentrate and a water softening additive, including a pair of containers, separate vertically separated input and output couplings connected to each of the containers, a sight glass extending between the input and output couplings of each of the containers and means connected to the outlet coupling of the container for storing soap concentrate for preventing formation of soap-suds in the sight glass due to withdrawing of soap through the output coupling of the container for storing soap concentrate, a lubricant reservoir, mixture control means operable between the means for storing a soap concentrate and additive and the lubricant reservoir for metering predetermined quantities of soap concentrate, additive and water into the lubricant reservoir to provide a diluted lubricant, means for storing the diluted lubricant under pressure, and means for distributing the diluted lubricant from the reservoir to remote mechanisms to be lubricated.

References Cited in the file of this patent

UNITED STATES PATENTS

| | | |
|---|---|---|
| 1,131,011 | Shoemaker et al. | Mar. 9, 1915 |
| 1,144,868 | Roy | June 29, 1915 |
| 1,577,686 | Breyer | Mar. 23, 1926 |
| 1,981,160 | Baldwin | Nov. 20, 1934 |
| 2,048,323 | Cutts | July 21, 1936 |
| 2,388,177 | Patterson et al. | Oct. 30, 1945 |
| 2,718,481 | Tuthill | Sept. 20, 1955 |
| 3,023,848 | Osterman | Mar. 6, 1962 |